United States Patent
Hezar et al.

(10) Patent No.: US 10,224,811 B2
(45) Date of Patent: Mar. 5, 2019

(54) METHODS AND APPARATUS TO REDUCE ELECTROMAGNETIC INTERFERENCE IN A POWER CONVERTER USING PHASE HOPPING IN CONJUNCTION WITH PULSE WIDTH MODULATION

(71) Applicant: Texas Instruments Incorporated, Dallas, TX (US)

(72) Inventors: Rahmi Hezar, Allen, TX (US); Nikolaus Klemmer, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/422,183

(22) Filed: Feb. 1, 2017

(65) Prior Publication Data

US 2018/0219480 A1     Aug. 2, 2018

(51) Int. Cl.
*H02J 3/12* (2006.01)
*G05F 1/00* (2006.01)
*H02M 3/156* (2006.01)
*H02M 1/44* (2007.01)
*H02M 1/12* (2006.01)

(52) U.S. Cl.
CPC .............. *H02M 3/156* (2013.01); *H02M 1/12* (2013.01); *H02M 1/44* (2013.01)

(58) Field of Classification Search
CPC ................................ G05F 1/565; G05F 1/575
USPC ................... 323/237, 239, 241–243
See application file for complete search history.

(56) References Cited

U.S. PATENT DOCUMENTS

| | | | | |
|---|---|---|---|---|
| 6,885,177 B2 * | 4/2005 | Fukui | ............... | H02M 3/156 323/242 |
| 9,203,294 B2 | 12/2015 | Nishijima | | |
| 2015/0015224 A1 * | 1/2015 | Yasusaka | ............... | G05F 1/575 323/280 |
| 2015/0357914 A1 * | 12/2015 | Ozanoglu | ............ | H02M 3/158 323/271 |
| 2016/0006336 A1 * | 1/2016 | Bennett | ............... | H02M 1/00 323/271 |
| 2016/0011611 A1 * | 1/2016 | Yuan | ............... | H02M 3/156 323/280 |
| 2016/0077142 A1 | 3/2016 | Kanayama et al. | | |

OTHER PUBLICATIONS

Tao et al., "A Buck Converter With Reduced Output Spurs Using Asynchronous Frequency Hopping," IEEE Transactions on Circuits and Systems—II: Express Briefs, vol. 58, No. 11, Nov. 2011, 5 pages.

(Continued)

*Primary Examiner* — Gary Nash
(74) *Attorney, Agent, or Firm* — Michael A. Davis, Jr.; Charles A. Brill; Frank D. Cimino

(57) ABSTRACT

Methods and apparatus for reducing electromagnetic interference in a power converter using phase hopping in conjunction with pulse width modulation are disclosed. An example power converter includes an input voltage to, when a control switching device receives a first voltage, increase an output voltage; and when the control switching device receives a second voltage, decrease the output voltage. The example power converter further includes a phase hopping generator to generate a phase varying signal corresponding to two or more phases, the phase varying signal corresponding to a reference voltage; and output the phase varying signal to control the control switching device.

30 Claims, 6 Drawing Sheets

(56) References Cited

OTHER PUBLICATIONS

Tao et al., "A Low-Noise PFM-Controlled Buck Converter for Low-Power Applications," IEEE Transactions on Circuits and Systems—I: Regular Papers, vol. 59, No. 12, Dec. 2012, 10 pages.

Tao et al., "A GSM Power Amplifier Directly-Powered From a DC-DC Power Converter," IEEE Microwave and Wireless Components Letters, vol. 22, No. 1, Jan. 2012, 3 pages.

\* cited by examiner

METHODS AND APPARATUS TO REDUCE ELECTROMAGNETIC INTERFERENCE IN A POWER CONVERTER USING PHASE HOPPING IN CONJUNCTION WITH PULSE WIDTH MODULATION

FIELD OF THE DISCLOSURE

This disclosure relates generally to power converters and, more particularly, to methods and apparatus to reduce electromagnetic interference in a power converter using phase hopping in conjunction with pulse width modulation.

BACKGROUND

A power converter is a circuit that is used in various devices to convert an input voltage to a desired output voltage. Some power converters use a switching regulator to control the conversion of power in a highly efficient manner. However, the switching operation generates harmonic tones that may leak into the input and/or output of such power converters, thereby causing electromagnetic interference in the output of such power converters. Various techniques may be used to reduce the effects of electromagnetic interference in switching regulators by spreading the electromagnetic interference across the frequency spectrum to reduce the effect within any one frequency range.

SUMMARY

Examples disclosed herein reduce electromagnetic interference in a power converter using phase hopping in conjunction with pulse width modulation. An example power converter includes an input voltage to, when a control switching device receives a first voltage, increase an output voltage; and when the control switching device receives a second voltage, decrease the output voltage. The example power converter further includes a phase hopping generator to generate a phase varying signal corresponding to two or more phases, the phase varying signal corresponding to a reference voltage; and output the phase varying signal to control the control switching device.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
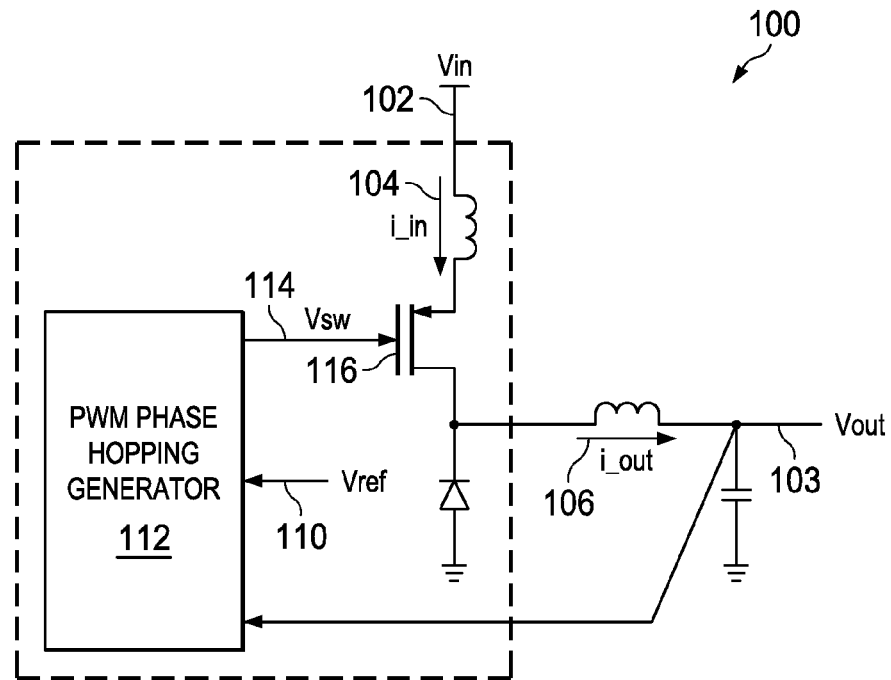
FIG. 1 is an illustration of an example power converter to reduce electromagnetic interference using phase hopping in conjunction with pulse width modulation.

Switch mode power converters are highly efficient power converters that convert an input voltage to an output voltage by enabling and disabling (e.g., cycling) a controlled switching device(s) (e.g., a transistor(s)) using a generated pulse width modulation signal to output a desired output voltage. The efficiency of a power converter (e.g., power converter efficiency) depends on the amount of time that the control switching device is enabled (e.g., corresponding to a duty cycle). Although switch mode power converters are efficient, switching a control switching device from enable to disable and vice versa generates unwanted electromagnetic interference (EMI) in the form of spurs (i.e., spurious radio frequency emissions at fundamental and/or harmonic tones) at various bands of the output frequency spectrum. Such spurs degrade the quality of output of the power converter.

Some conventional switch mode power converters apply frequency hopping to minimize the effect of the spurs generated in such conventional switch mode power converters. Frequency hopping reduces spur power (e.g., corresponding to the harmonic peak of a tone at a frequency with the highest energy of the output frequency spectrum) by spreading the spur power throughout the output spectrum, thereby reducing the effects of EMI. As used herein, a harmonic peak represents an energy level of a fundamental tone or a harmonic tone at a frequency of a frequency spectrum caused by EMI. As used herein, spur power corresponds to the highest peak energy of a signal across the frequency spectrum of the signal. Frequency hopping includes varying (e.g., adjusting, switching, or hopping) the switching frequency of the power converter to two or more frequencies. For example, frequency hopping may include switching the transistor(s) (e.g., on and off) between at a first frequency (1.1 Megahertz (MHz)) for a first duration of time, a second frequency (1.0 MHz) for a second duration of time, and a third frequency (0.9 MHz) for a third duration of time. Although conventional frequency hopping reduces spur power, conventional frequency hopping techniques increases the average switching loss, thereby decreasing the efficiency of the power converter. Additionally, conventional frequency hopping techniques require multiple ramp generation circuits (e.g., a circuit for each frequency) which require different size capacitors and current sources, thereby increasing the cost and complexity of such conventional power converters. Examples disclosed herein alleviate the problems associated with such convention power converters by spreading the EMI generated by a power converter to reduce spur power without applying frequency hopping, thereby eliminating the need of multiple ramp generation circuits.

Examples disclosed herein reduce electromagnetic interference in a power converter using a pulse width modulation (PWM) phase hopping technique. PWM phase hopping includes varying (e.g., changing) the phase of a PWM signal used to enable and/or disable transistor(s) used to generate a desired output voltage. Examples disclosed herein may include any number of phases to generate the PWM phase hopping signal. In some examples, the phase is changed every PWM cycle. In some examples, the phase is changed every two or more PWM cycles. In some examples, a digital controller and/or other processing device may generate the PWM phase hopping signal to control the transistor(s) of the power converter. In some examples, hardware is utilized to generate the PWM phase hopping signal. Alternatively, any combination of hardware, software, and/or firmware may be used to generate the PWM phase hopping signal. As used herein, phase hopping includes varying, adjusting, and/or changing the phase of a PWM signal between two or more phases.

Example PWM phase hopping techniques disclosed herein significantly reduce a fundamental peak of an output signal and eliminate harmonic peaks of the output signal without reducing the efficiency of the power converter. For example, a conventional PWM switching power converter that does not include phase hopping converts 12 Volts (V) to 3.3 V at a 2.1 MHz frequency at an 87% efficiency, with a fundamental peak of −24 dB. An example PWM 8-phase hopping power converter disclosed herein converts 12V to 3.3V at a 2.1 MHz frequency at an 87% efficiency, with a fundamental peak at −36 dB (e.g., a −12 dB spur power reduction). Additionally, an example PWM 16-phase hopping power converter disclosed herein converts 12V to 3.3V at a 2.1 MHz frequency at an 87% efficiency, with a fundamental peak at −36 B (e.g., a −15 dB spur power reduction).

The illustration of FIG. 1 illustrates an example power converter 100 to reduce EMI using PWM phase hopping. The example power converter 100 receives the example input voltage (Vin) 102 and outputs the example output voltage (Vout) 103. The example power converter 100 includes an example input current 104, an example output current 106, an example reference voltage (Vref) 110, and example PWM phase hopping generator 112, an example switching voltage (Vsw) 114, and an example control switching device 116.

The example power converter 100 of FIG. 1 is an integrated circuit (IC) chip to convert the example Vin 102 to the example Vout 103 based on the example Vref 110 using a frequency and/or phase varying (e.g., hopping) technique. Alternatively, the example power converter 100 may be any kind of circuit. The example power converter may be a DC/DC converter (e.g., a buck converter or boost converter), an AC/DC converter, an AC/AC converter, and/or any other type of converter. Accordingly, the example Vin 102 and/or the example Vout 103 may be an alternating current (AC) voltage or a direct current (DC) voltage. In some examples, the example Vin 102 corresponds to an input device coupled to the input of the example power converter 100. In such examples, EMI tones may couple to the input device conductively via transmission lines, IC chip/board substrates and/or inductors. The input device corresponds with an input inductance and capacitance. Additionally, the example Vout 103 may correspond with an output device coupled to the output of the example power converter 100. In such examples, the example output current 106 is the current drawn by the output device. EMI tones may couple to the output device conductively via transmission lines, IC chip/board substrates and/or inductors. The output device corresponds with an output inductance and capacitance.

The example PWM phase hopping generator 112 of FIG. 1 generates the example Vsw 114 (e.g., a signal cycling through voltage pulses at different phases) to enable and/or disable the example control switching device 116, thereby generating the example output current 106 and the example Vout 103. Although the illustrated example of FIG. 1 illustrates the example control switching device 116 as a transistor, the example control switching device 116 may be any device capable of controlling current and/or voltage in a circuit. When the example Vsw 114 is a high voltage, the example control switching device 116 is enabled allowing the example input current 104 to flow through the example control switching device 116 and be output as the example output current 106, thereby increasing the example Vout 103. When the example Vsw is a low voltage, the example control switching device 116 is disabled preventing the example input current 104 to flow through the example control switching device 116 such that the example output current 106 does not flow, thereby decreasing the example Vout 103. The example PWM phase hopping generator 112 cycles the pulses (e.g., high voltage and low voltage) of the example Vsw 114 to generate a PWM signal that substantially maintains the example Vout 103 to a desired voltage (e.g., Vref 110). The example Vref 110 may be a predetermined voltage (e.g., 3.3 V, 5 V, etc.) or may be an input (e.g., a voltage input (or signal representative of a voltage) from an exterior source that may be adjusted at any point). In some examples, as illustrated in the example power converter 100, the example PWM phase hopping generator 112 receives the example Vout 103 to generate a feedback loop to ensure that the example Vout 103 corresponds to the intended or desired voltage level (e.g., the example Vref 110).

The example PWM phase hopping generator 112 of FIG. 1 generates a PWM phase hopping signal that is output as the example Vsw 114. The example Vsw 114 corresponds to a PWM phase hopping signal that, when applied to the gate of the example control switching device 116, will result in the example Vout 103 being the same as the desired Vref 110. An example of the Vsw 114 is further illustrated in conjunction with FIG. 5. In some examples, such as the example power converter 100 of FIG. 1, the example Vout 103 is fed back to the example PWM phase hopping generator 112 to determine if the example Vout 103 is at the desired output voltage (e.g., the example Vref 110). In this manner, if the example Vout 103 is too high or too low, the example PWM phase hopping generator 112 can adjust the example Vsw 114 to compensate. As described above, the example Vsw 114 is a phase hopped signal that after one or more cycles changes phases, thereby reducing spur power by spreading EMI of the example Vout 103 throughout the entire frequency spectrum. The example PWM phase hopping generator 112 may include hardware, software, and/or firmware to generate the example Vsw 114. For example, the PWM phase hopping generator 112 may be a controller, processor, or other device capable of outputting a phase hopping signal. Alternatively, the example PWM phase hopping generator 112 may include hardware components to output the phase hopping signal. An example of the PWM phase hopping generator 202 is further described below in conjunction with FIG. 2.

Figure 2:
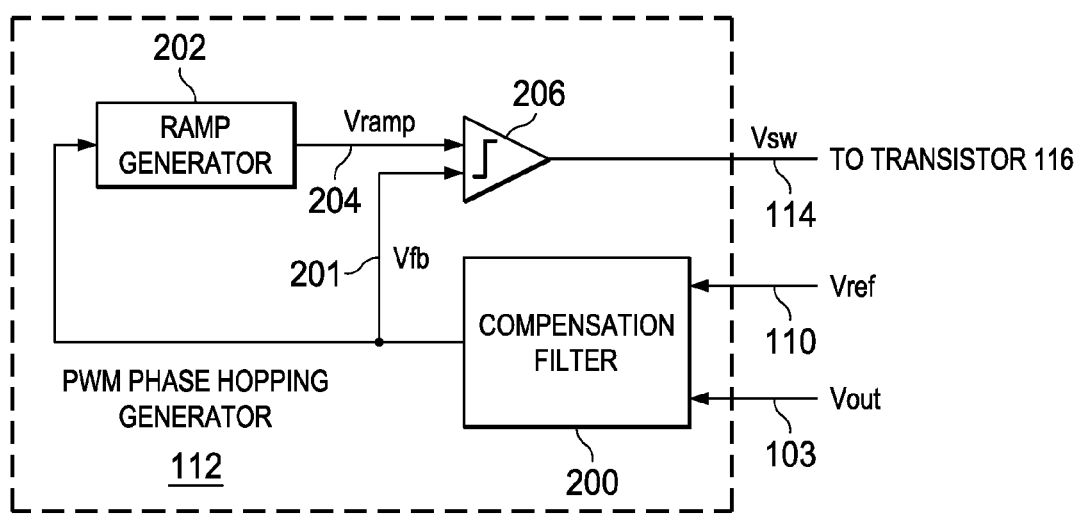
FIG. 2 is a block diagram of an example pulse width modulation phase hopping generator of FIG. 1.

FIG. 2 is a block diagram of an example implementation of the example PWM phase hopping generator 112 of FIG. 1, disclosed herein, to generate the example Vsw 114, a PWM phase hopping signal. While the example PWM phase hopping generator 112 is described in conjunction with the example power converter 100 of FIG. 1, the example PWM phase hopping generator 112 may be utilized to generate a PWM phase hopping signal in any type of power converter. The example PWM phase hopping generator 112 receives the example Vout 103 and the example Vref 110 and outputs the example Vsw 114 of FIG. 1. The example PWM phase hopping generator 112 includes an example compensation filter 200, an example feedback voltage (Vfb) 201 an example ramp generator 202, an example ramp voltage (Vramp) 204, and an example comparator 206.

The example compensation filter 200 of FIG. 2 filters the example Vout 103 based on the example Vref 110 to generate the example feedback voltage 201. The feedback voltage 201 ensures that the example Vout 103 is output at the desired voltage level. In the illustrated example of FIG. 2, the desired voltage level is the example Vref 110. For example, if the example Vout 103 is higher or lower than the example Vref 110, the example compensation filter 200 adjusts the feedback loop signal (e.g., voltage) to ensure that the example Vsw 114 will correspond to the example Vref 110. In other words, the example feedback voltage 201 is the example Vref 110 with an error correction for any error in the example Vout 103. The example compensation filter 200 outputs the feedback voltage 201 to the example comparator 206.

The example ramp generator 202 of FIG. 2 generates the example Vramp 204. The example Vramp 204 is a ramp signal that increases voltage at a substantially steady rate to a desired voltage. Once the desired voltage is reached, the voltage quickly decreases followed by an increase of the voltage at a substantially steady rate. Alternatively, the ramp generator 202 may output any type of periodic signal (e.g., waveform), including but not limited to, a triangle signal, a sinusoidal signal, a square signal, etc. The example ramp generator 202 may include a controller, processor, or other device capable of outputting the example Vramp 204 at two or more phases. Additionally or alternatively, the example ramp generator 202 may include hardware components to generate the example Vramp 204, as further described in conjunction with FIG. 3. The example ramp generator 202 is capable of adjusting the phase of the example Vramp 204 to two or more phases. The example ramp generator 202 changes the phase of the example Vramp 204 every one or more cycles to reduce the spur power of the power converter 100 of FIG. 1. The way the Vramp 204 is adjusted (e.g., the number of phases, the order of phases, the number of cycles before adjusting, etc.) may be random and/or pre-set based on user and/or manufacture preferences.

The example comparator 206 of FIG. 2 compares the example Vramp 204 output by the example ramp generator 202 to the example feedback voltage 201 output by the example compensation filter 200 to generate the example Vsw 114. When the example Vramp 204 is larger than the example feedback voltage 201, the example comparator 206 outputs a high voltage (e.g., 3 V) and, when the example Vramp 204 is smaller than the example feedback voltage 201, the example comparator 206 outputs a low voltage (e.g., 0V). In the illustrated example of FIG. 2, the Vramp 204 will be larger than the example feedback voltage 201 for a first portion of time and will be smaller than the feedback voltage 201 for a second portion of time (e.g., generating a pulse wave) depending on the phase of the example Vramp 204. The phase of the example Vramp 204 changes every one or more cycles. Accordingly, the phase of the example Vsw 114 (e.g., the output of the example comparator 206) changes every one or more cycles. As described above in conjunction with FIG. 1, the output of the example comparator 206 is used to control (e.g., enable or disable) the example control switching device 116 of FIG. 1. Accordingly, the example Vsw 114 (e.g., the pulse wave output of the example comparator 206) enables the example control switching device 116 to increase the example Vout 103 (e.g., using the example Vin 102) for the first duration of time and decrease Vout 103 for the second duration of time. The enabling and/or disabling of the example control switching device 116 creates a substantially stable Vout 103 (e.g., substantially equal to the example Vref 110).

Figure 3:
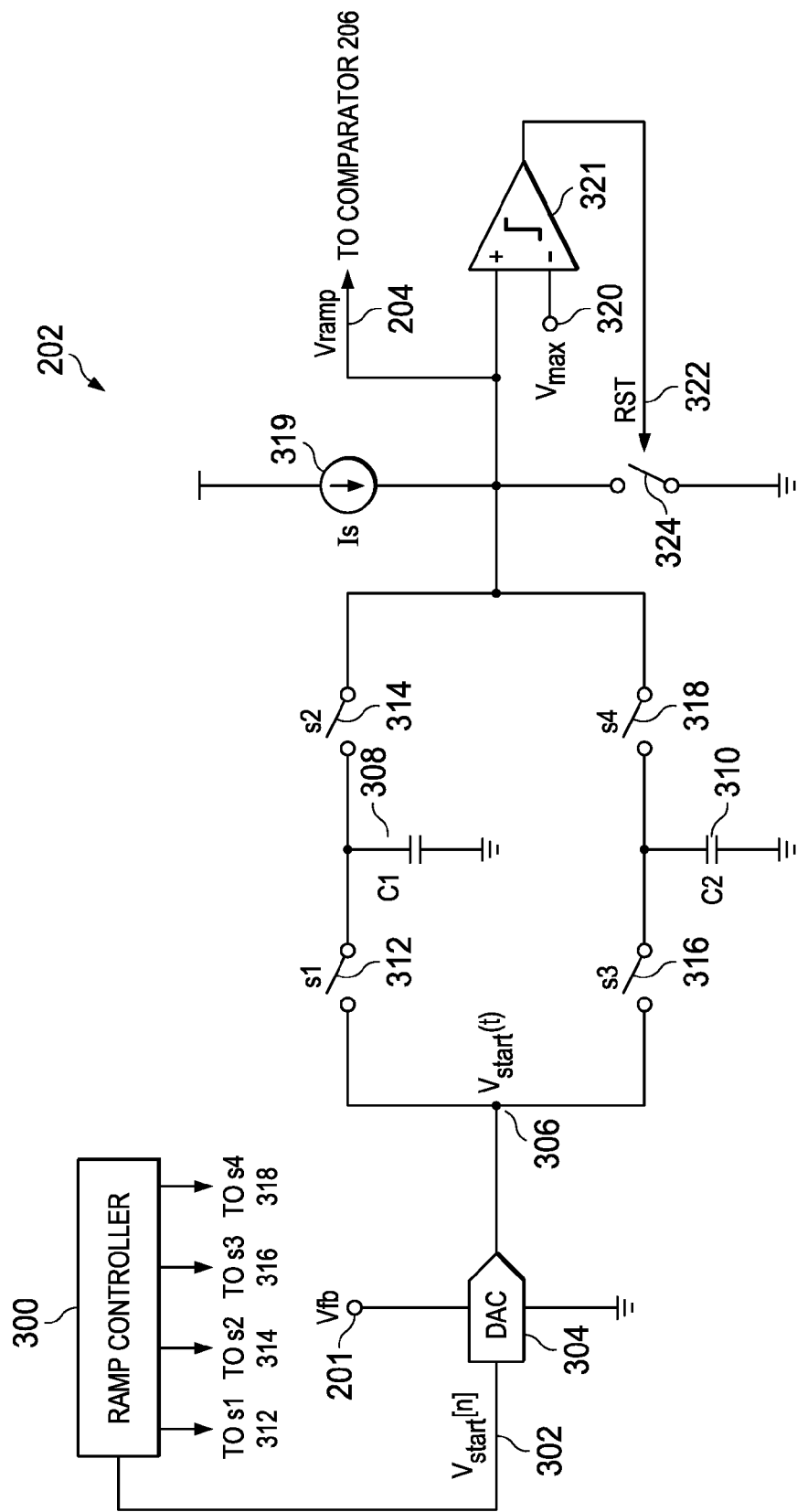
FIG. 3 is a circuit diagram of an example ramp generator of FIG. 2.

FIG. 3 is an example circuit diagram of the example ramp generator 202 of FIG. 2. Although FIG. 3 illustrates a hardware implementation of the example ramp generator 202, the example ramp generator 202 may alternatively be a controller, a processor, or other device capable of outputting the example Vramp 204. The example ramp generator 202 includes the example feedback voltage 201 and the example Vramp 204 of FIG. 2. The example ramp generator 202 further includes an example ramp controller 300, an example start voltage signal (Vstart[n]) 302, an example digital to analog converter 304, an example start voltage (Vstart[t]) 306, example capacitors 308, 310, example switches 312, 314, 316, 318, an example current source 319, an example maximum voltage (Vmax) 320, an example comparator 321, an example reset signal 322, and an example reset switch 324.

The example ramp controller 300 of FIG. 3 generates the example Vstart[n] signal 302 for a preset amount of time, which includes a random or preselected number (e.g., a digital value) that is input into the example digital-to-analog converter 304. The random number corresponds to a phase of the Vramp 204. The example digital-to-analog converter 304 generates the example Vstart[t] voltage 306 based on the Vstart[n] signal 302 and the example feedback voltage 201. The output of the example digital-to-analog converter 304 is a voltage between 0 volts and the feedback voltage 201. For example, each value of the example Vstart[s] 302 may corresponds to a fraction of the example feedback voltage 201, thereby corresponding to the phase alignment of the example Vramp 204. As further described below, the example Vstart[t] voltage 306 corresponds to the initial voltage of a cycle (e.g., if the Vstart[t] voltage 306 is high, the initial voltage of the next cycle will be high, corresponding to a reduced phase of the example Vsw 114, and if the Vstart[t] voltage 306 is low, the initial voltage of the next cycle will be low, corresponding to an increased phase of the example Vsw 114). The example Vstart[t] voltage 306 is used to charge one of the example capacitors 308, 310 when one of the sets of example switches s1 312 and s4 318 or s2 314 and s3 316 are enabled. For example, the Vstart[t] 306 is applied to the first example capacitor C1 308 (e.g., by enabling the example switch s1 312) to provide an initial voltage for the example Vramp 204 during a first subsequent cycle. When the first subsequent cycle begins and the Vstart 316 changes, the example Vstart 316 is applied to the example capacitor C2 310 (e.g., by enabling the example switch s3 316) to provide the initial voltage to the example Vramp 204 at a second subsequent cycle. The example ramp controller 300 controls (e.g., enables/disables) the example switches 312, 314, 316, 318. The rate of the example Vramp 202 is determined based on the size of the example capacitors 308, 310 and the current source 319. In this manner, the phase of the example Vramp 204 may be adjusted at set points in time (e.g., based on the example Vstart[t] voltage 306) to generate the example Vramp 204 corresponding to the generation of a PWM phase hopping signal. As explained above in conjunction with FIG. 2, the example Vramp 204 is transmitted to the example comparator 206 to generate the example Vsw 114 of FIG. 2 (e.g., the PWM phase hopping signal). An example phase hopping Vramp 204 is further described below in conjunction with FIG. 5.

The example comparator 312 of FIG. 1 compares the example Vramp 204 to the example Vmax 320 (e.g., a threshold voltage) to generate the example reset signal 322. For example, when the example Vramp 204 is above the example Vmax 320, the example comparator 321 outputs the example reset signal 322 as a first voltage (e.g., a high voltage). When the example Vramp 204 is below the example Vmax 320, the example comparator 312 outputs the example reset signal 322 as a second voltage (e.g., a low voltage). The example reset signal 322 is used to enable and/or disable (e.g., open and/or close) the example reset switch 324. Enabling the reset switch 324 provides a path to ground (e.g., discharging the example capacitors 308, 310), thereby reducing the example Vramp 204 to a lower voltage (e.g., zero and/or the example Vstart[t] 306). In this manner, when the example Vramp 204 reaches the example Vmax 320, the example Vramp 204 drops, thereby restarting the ramp. Although the illustrated example of the ramp generator 202 includes two capacitors, the example ramp generator 202 may include any number of capacitors.

While example manners of implementing the example PWM phase hopping generator 112 of FIG. 1 is illustrated in FIG. 2, elements, processes and/or devices illustrated in FIG. 2 may be combined, divided, re-arranged, omitted, eliminated and/or implemented in any other way. Further, the example compensation filter 200, the example Ramp generator 202, the example comparator 206, the example ramp controller 300, and/or, more generally, the example PWM phase hopping generator 112 of FIGS. 1 and 2, may be implemented by hardware, machine readable instructions, software, firmware and/or any combination of hardware, machine readable instructions, software and/or firmware. Thus, for example, any of the example compensation filter 200, the example Ramp generator 202, the example comparator 206, the example ramp controller 300, and/or, more generally, the example PWM phase hopping generator 112 of FIGS. 1 and 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example compensation filter 200, the example Ramp generator 202, the example comparator 206, the example ramp controller 300, and/or, more generally, the example PWM phase hopping generator 112 of FIGS. 1 and 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example PWM phase hopping generator 112 of FIGS. 1 and 2 includes elements, processes and/or devices in addition to, or instead of, those illustrated in FIG. 4, and/or may include more than one of any or all of the illustrated elements, processes and devices.

Figure 4:
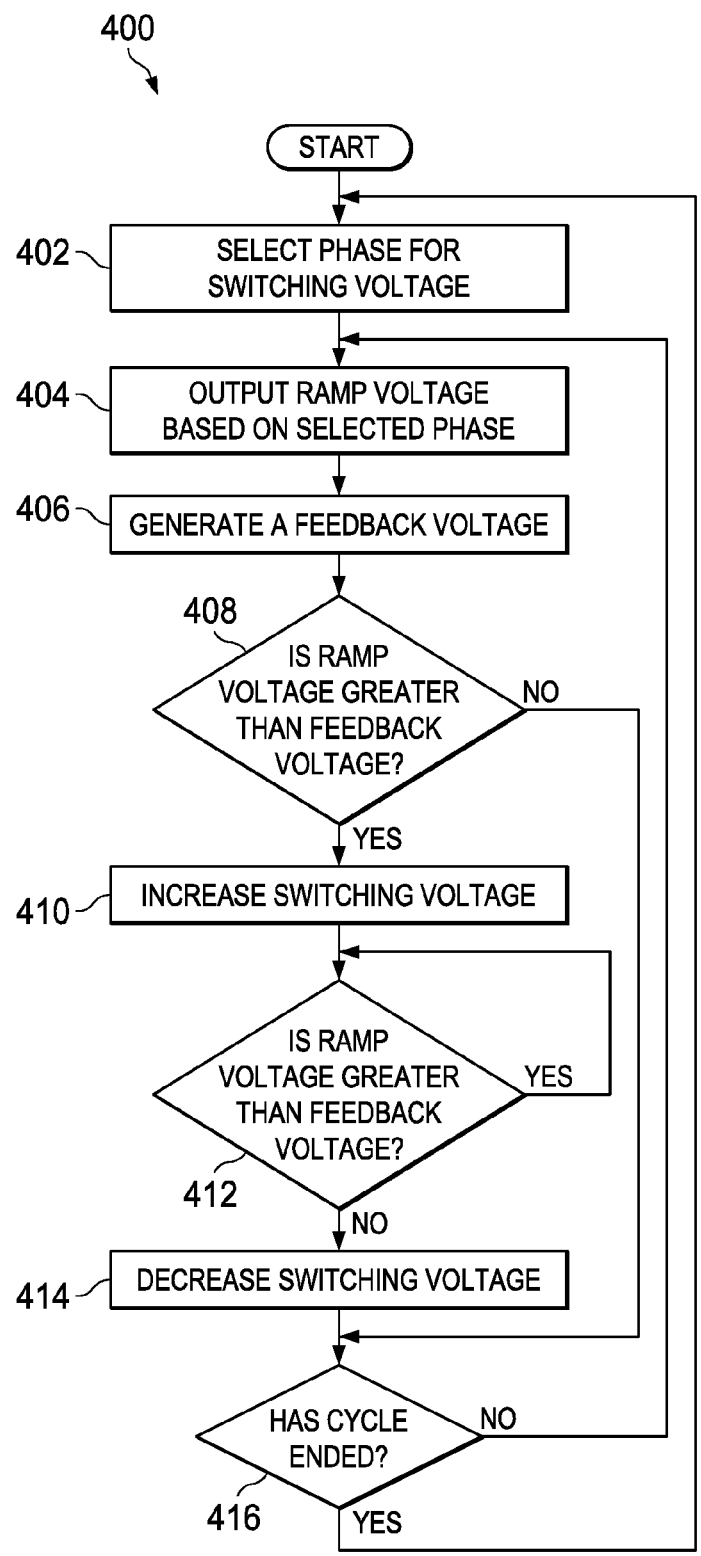
FIG. 4 is a flowchart representative of example machine readable instructions that may be executed to implement the example pulse width modulation phase hopping generator of FIGS. 1 and 2 to output an example switching voltage of FIGS. 1 and 2.

A flowchart representative of example machine readable instructions for implementing the example PWM phase hopping generator 112 of FIGS. 1 and 2 are shown in FIG. 4. In the examples, the machine readable instructions comprise a program for execution by a processor such as the processor 712 shown in the example processor platform 700 discussed below in connection with FIG. 7. The program may be embodied in machine readable instructions stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 4, many other methods of implementing the example PWM phase hopping generator 112 of FIGS. 1 and 2 may alternatively be used. For example, the order of execution of the blocks may be changed, and/or some of the blocks described may be changed, eliminated, or combined.

As mentioned above, the example process of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example process of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 4 is an example flowchart 400 representative of example machine readable instructions that may be executed by the example PWM phase hopping generator 112 of FIGS. 1 and 2 to reduce EMI in the example power converter 100 using phase hopping in conjunction with pulse width modulation. Although the instructions of FIG. 4 are described in conjunction with the example PWM phase hopping generator 112 of FIGS. 1 and 2, the example instructions may be utilized by any type of controller in any type of power converter.

At block 402, the example ramp generator 202 selects a phase for the example Vsw 114. The example ramp generator 202 may select the phase randomly (e.g., using a pseudo random number generator) and/or based on a pre-set phase hopping pattern or configuration. At block 404, the example ramp generator 202 outputs the example Vramp 204 based on the selected phase. When the example ramp generator 202 corresponds to the ramp generator 202 of FIG. 3, the example ramp controller 300 selects transmits a random number via the example Vstart[n] signal 302 to generate the example Vstart[t] 306 corresponding to the selected phase. In some examples, the ramp controller 300 may enable and/or disable the example switches 312-318 to charge and/or discharge one or more of the example capacitors 308, 310 to hop (e.g., switch, adjust, or vary) from one phase to another at the beginning/ending of a cycle.

At block 406, the example compensation filter 200 generates a feedback signal based on a difference between the example Vref 110 and the example Vout 103 to ensure that the example Vout 103 corresponds to the example Vref 110. For example, if the Vout 103 is too low, the example compensation filter 200 may lower the feedback signal, thereby resulting in an increase in the example Vout 103 (e.g., via an increase of the width of the pulse of the example Vsw 114). If the Vout 103 is too high, the example compensation filter 200 may increase the feedback signal, thereby resulting in a decrease in the example Vout 103 (e.g., via a decrease of the width of the pulse of the example Vsw 114).

At block 408, the example comparator 206 determines if the example Vramp 204 is greater than the example feedback voltage 201 output by the example compensation filter 200. If the example comparator 206 determines that the example Vramp 204 is not greater than the example feedback voltage 201 (block 408: NO), the process continues to block 416. If the example comparator 206 determines that the example Vramp 204 is greater than the example feedback voltage 201 (block 408: YES), the example comparator 206 increases the example Vsw 114 to a high voltage (block 410). The high voltage is a voltage that, when applied to the gate of the example control switching device 116, enables the example control switching device 116 to increase the example Vout 103 of FIGS. 1, 2, and/or 3. The high voltage corresponds to a pulse of a pre-set width. The example ramp generator 202 continues to increase and/or maintain the example Vramp 204 above the example feedback voltage 201 for a pre-set amount of time corresponding to the pre-set width. After the pre-set amount of time expires and/or after the cycle has ended, the example ramp generator 202 decreases the example Vramp 204 to a level below the feedback voltage 201. In some examples, the ramp generator 202 decreases the Vramp 204 based on a comparison of the example comparator 321. For example, as described above in conjunction with FIG. 3, the comparator 321 outputs the example reset signal 322 as a first voltage when the example Vramp 204 is above the example Vmax 320, thereby enabling the example reset switch 324 to decrease the example Vramp.

At block 412, the example comparator 206 determines if the example Vramp 204 is greater than the example feedback voltage 201. If the example comparator 206 determines that the example Vramp 204 is greater than feedback voltage 201 (block 412: YES), the example comparator 206 continues to output the increased Vsw 114 at the high voltage level until the example ramp generator decreases the example Vramp 204. If the example comparator 206 determines that the example Vramp 204 is not greater than feedback voltage 201 (block 412: NO), the example comparator 206 decreases the example Vsw 114 to a low voltage (block 414), thereby disabling the example control switching device 115.

At block 416, the example ramp generator 202 determines if the cycle has ended. If the example ramp generator 202 determines that the cycle has not ended, (block 416: NO) the process returns to block 404 as the example ramp generator 202 repeats the example Vramp 204 until the cycle ends. If the example ramp generator 202 determines that the cycle has ended, (block 416: YES) the process returns to block 402 and the example ramp generator 202 selects a new phase for the example Vsw 114. As described above, in some examples, the example ramp generator 202 may apply the same phase for any number of cycles before hopping to a new phase. In such examples, the example ramp generator 202 may select the same phase for the example Vsw 114 until the desired number of cycles has been applied using the selected phase.

Figure 5:
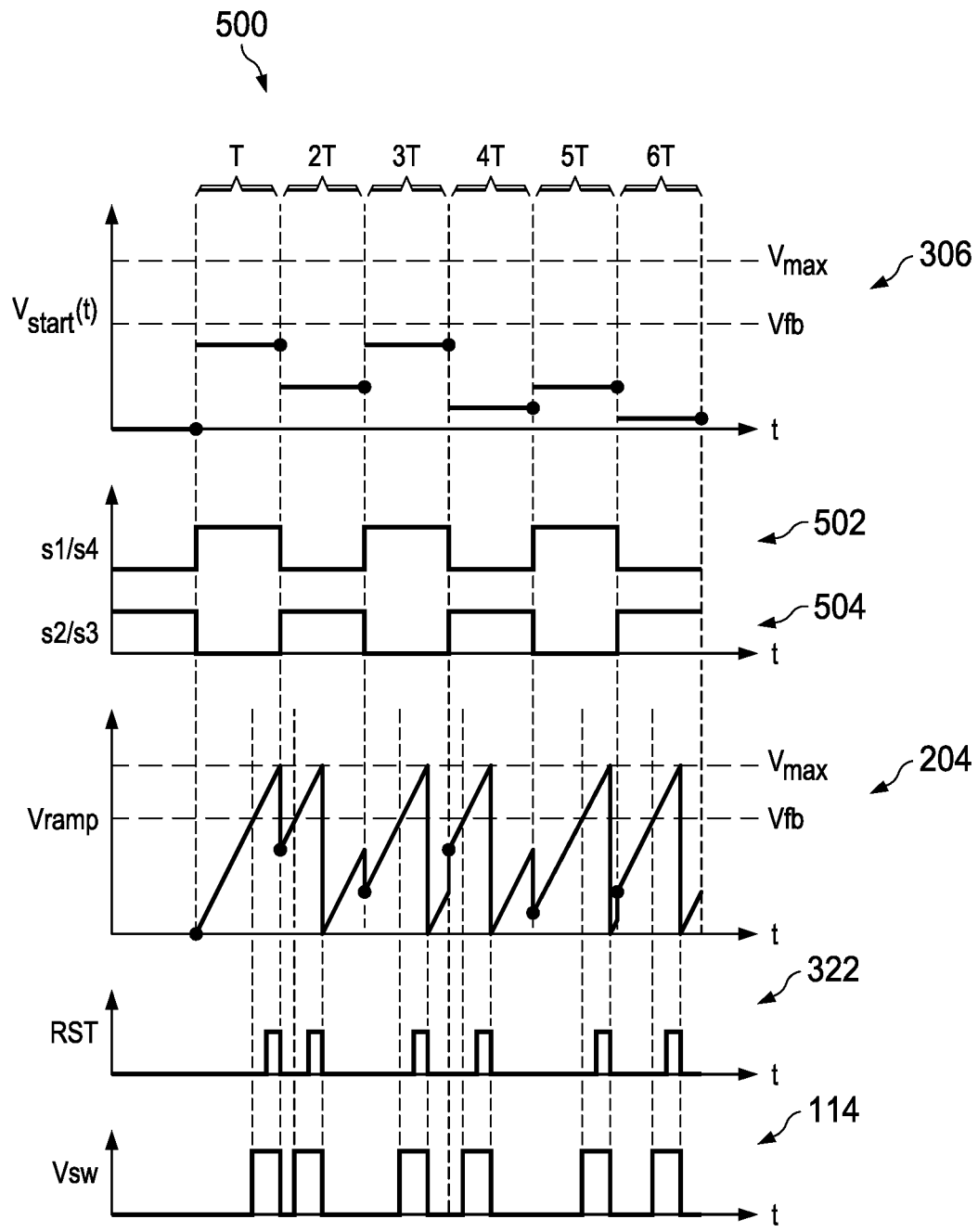
FIG. 5 illustrates an example timing diagram of the example switching voltage of FIGS. 1 and 2.

FIG. 5 is an example timing diagram 500 illustrating a sequence of the example Vsw 114 (e.g., a PWM phase hopping signal) of FIGS. 1 and 2. The example timing diagram 500 includes the example Vramp 204, the example Vstart[t] 306, the example reset signal 322 of FIGS. 2 and/or 3. The example timing diagram 500 also includes an example control signals 502, 504 used to control the example switches 312-318 of FIG. 3.

At time T of the example timing diagram 500 of FIG. 5, the example Vstart[t] 306 increases to a first voltage (e.g., corresponding to a first phase). As described above, the Vstart[t] 306 corresponds to the initial voltage of the example Vramp 204 at the subsequent (e.g., next) cycle. Between time T and 2T (e.g., the first cycle), the first example control signal 502 is high and the second example control signal 504 is low, thereby charging the first example capacitor 308. The example current source 319 and the size of the example capacitors 308, 310 correspond to the rate at which the Vramp 204 increases. At the end of the first cycle (e.g., near time 2T), the example Vramp 204 reaches the example Vmax 320, causing the example reset signal 322 to pulse high to enable the example reset switch 324. Enabling the example reset switch 324 decreases the example Vramp 204. Additionally at 2T, the control signals 502, 504 switch outputs (e.g., from a high voltage to a low voltage and vice versa), thereby setting to the Vramp 204 to charge the example voltage Vstart[t] 306 of the example capacitor C1 308. Because the example capacitor C1 308 was charged to the example Vstart[t] 306, the example Vramp 204 commences at the previously applied Vstart[t] 306. During the second cycle (e.g., the time between 2T and 3T), the example capacitor C2 310 charges to the new Vstart[t] 306, so that when the cycle ends, the initial voltage of the third cycle will correspond to the Vstart[t] 306. This process of selecting the initial voltage for the next cycle by charging on the example capacitors 308, 310 with Vstart[t] 306 allows the example ramp generator 202 to change the phase every one or more cycles, as shown in the example Vsw 114. As described above, the example phase hopping Vramp 204 is compared to the example feedback voltage 201 to generate the phase hopping Vsw 114 used to control the example power converter 100 of FIG. 1.

Figure 6:
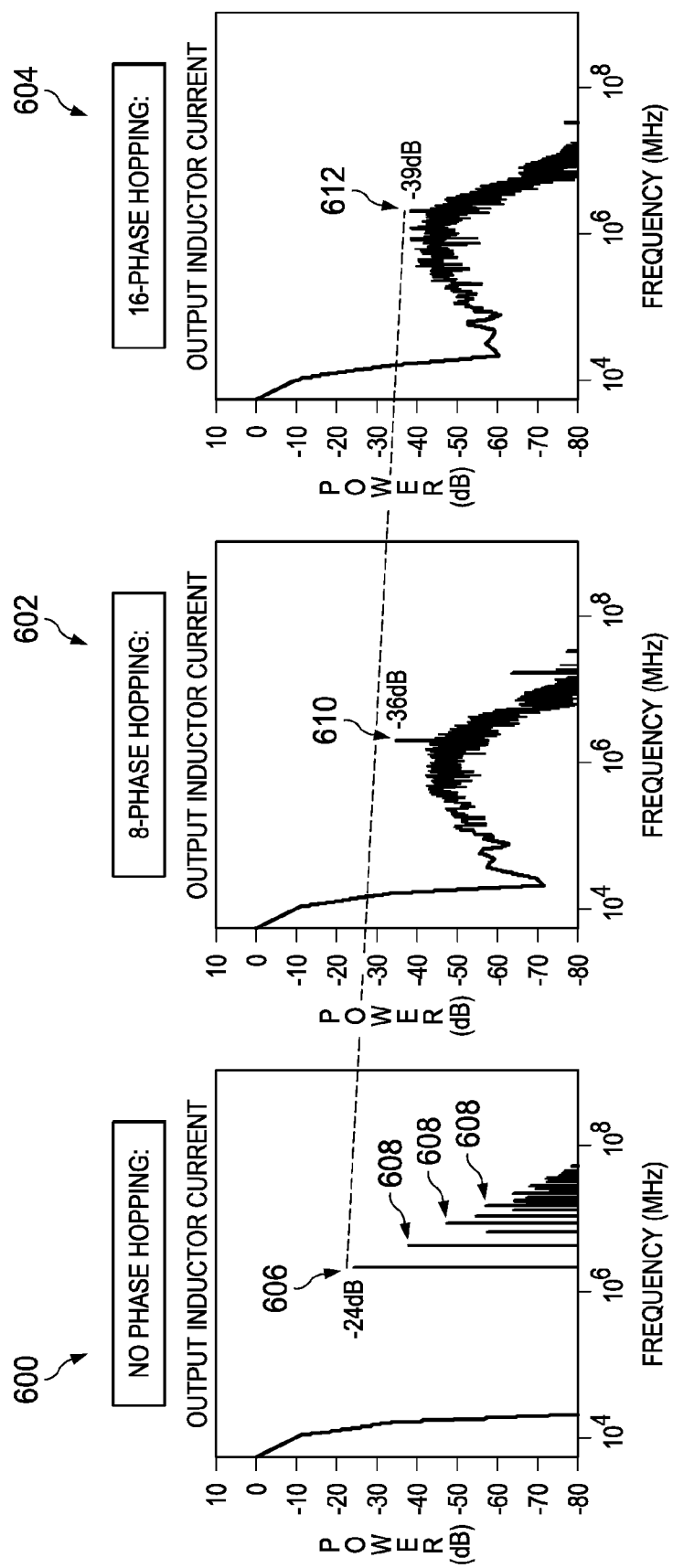
FIG. 6 illustrates an example of a reduction of electromagnetic interference in the example power converter of FIG. 1 using phase hopping in conjunction with pulse width modulation.

FIG. 6 illustrates a reduction in spur power corresponding to examples disclosed herein. FIG. 6 includes an example no-phase hopping frequency spectrum 600 corresponding to an output current of a no hopping power converter, an example 8-phase hopping frequency spectrum 602 corresponding to an output current of an 8-phase hopping power converter, and an example 16-phase hopping frequency spectrum 604 corresponding to an output current of a 16-phase hopping power converter. The example no phase hopping frequency spectrum 600 includes an example fundamental tone 606 and harmonic tones 608. The example 8-phase hopping frequency spectrum 602 includes an example 8-phase hopping fundamental tone 610. The example 16-phase hopping frequency spectrum 604 includes an example 16-phase hopping fundamental tone 612.

As illustrated in the example frequency spectrums 600, 602, 604 of FIG. 6, as the number of phases used for phase hopping increases, the fundamental tone 606, 610, 612 generated by EMI is decreased, thereby decreasing the spur power of output current. For example, the spur power of the example no-phase hopping frequency spectrum 600 (e.g., the power of the example fundamental tone 606) is −24 dB, the spur power of the example 8-phase hopping frequency spectrum 602 (e.g., the power of the example fundamental tone 610) is −36 dB, and the spur power of the example 16-phase hopping frequency spectrum 604 (e.g., the power of the example fundamental tone 612) is −39 dB. Additionally, phase hopping spreads the harmonic tones 608 across all frequencies of the spectrums, thereby reducing or otherwise eliminating the example harmonic tones 608 into high frequency noise, which corresponds to a smaller spur power and less EMI effect on the example output current and/or voltage.

Figure 7:
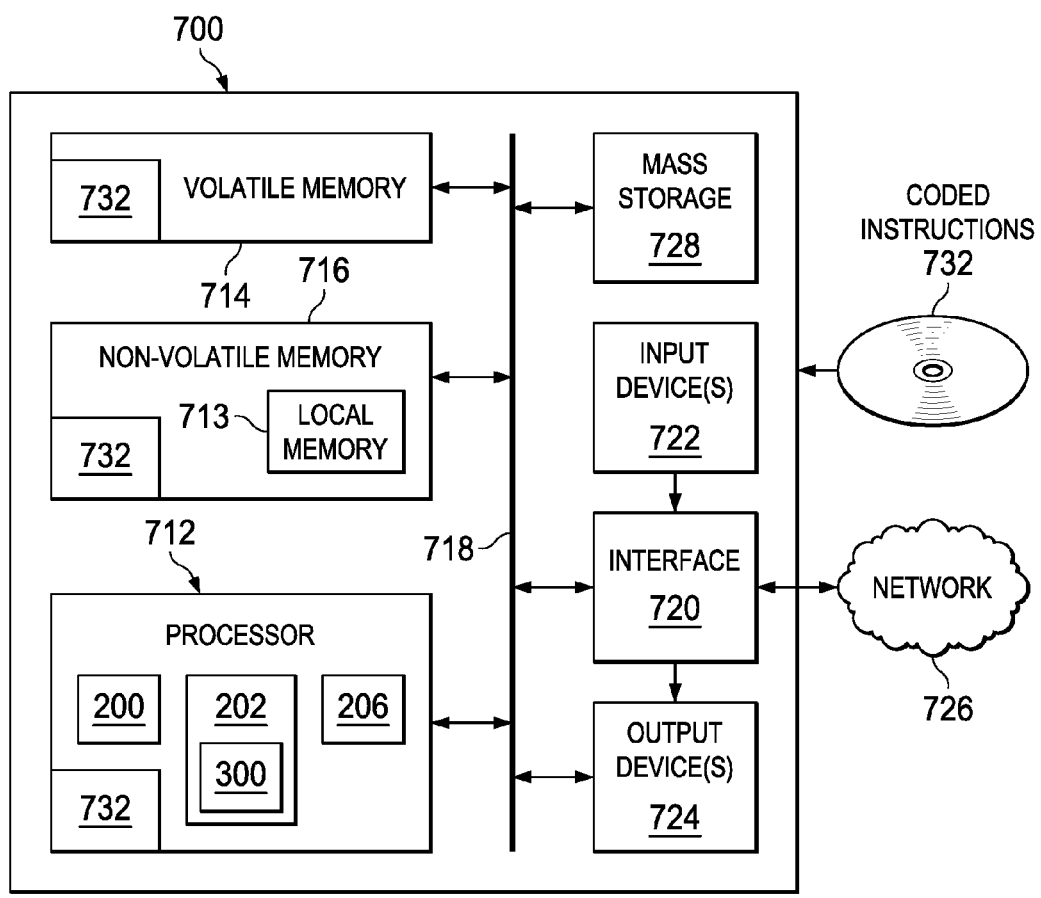
FIG. 7 is a block diagram of a processor platform structured to execute the example machine readable instructions of FIG. 4 to control the example pulse width modulation phase hopping generator of FIGS. 1-2.

FIG. 7 is a block diagram of an example processor platform 700 capable of executing the instructions of FIG. 4 to implement the example PWM phase hopping generator 112 of FIGS. 1 and/or 2. The processor platform 700 can be, for example, a server, a personal computer, a mobile device (e.g., a cell phone, a smart phone, a tablet such as an iPad™), a personal digital assistant (PDA), an Internet appliance, or any other type of computing device.

The processor platform 700 of the illustrated example includes a processor 712. The processor 712 of the illustrated example is hardware. For example, the processor 712 can be implemented by integrated circuits, logic circuits, microprocessors or controllers from any desired family or manufacturer.

The processor 712 of the illustrated example includes a local memory 713 (e.g., a cache). The example processor 712 of FIG. 7 executes the instructions of FIG. 4 to implement the example the example compensation filter 200, ramp generator 202, the example comparator 206, and/or the example ramp controller 300 of FIGS. 2 and/or 3 to implement the example PWM phase hopping generator 112 of FIG. 1. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a clock controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIG. 4 may be stored in the mass storage device 728, in the volatile memory 714, in the non-volatile memory 716, and/or on a removable tangible computer readable storage medium such as a CD or DVD.

From the foregoing, it would be appreciated that the above disclosed method, apparatus, and articles of manufacture reduce electromagnetic interference in a power converter using phase hopping in conjunction with pulse width modulation. Examples disclosed herein adjust the phase of a pulse width modulation signal applied to control switching device (e.g., a transistor) of a power converter to maintain an output voltage while reducing the spur power of the output voltage. In some examples, the PWM phase hopping signal is generated by a digital processor. In some examples, the PWM phase hopping signal is generated using a ramp voltage generated by one or more capacitors in parallel. Examples disclosed herein reduce spur power of the output of a power converter.

Conventional techniques for reducing spur power in a power converter include frequency hopping. Such conventional frequency hopping techniques increases the average switching loss, thereby decreasing the efficiency of the power converter. Additionally, conventional frequency hopping techniques require multiple ramp generation circuits (e.g., a circuit for each frequency) which require different size capacitors and current sources, thereby increasing the cost and complexity of such conventional power converters. Examples disclosed herein alleviate the problems associated with such conventional techniques by applying a PWM phase hopping technique, which reduces spur power without decreasing power converter efficiency. Additionally, examples disclosed herein only requires one circuit to generate the multiple phases for phase hopping. In this manner, the total board area necessary to phase hop is the same as the board area required for one frequency of conventional techniques. Additionally, examples disclosed herein reduce and/or otherwise eliminate harmonic tones of an output of the power converter.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. A power converter comprising:
  a switching device including a control input, the switching device being coupled between a voltage input and a voltage output to: increase a voltage at the voltage output responsive to the control input and a first voltage at the voltage input; and decrease the voltage at the voltage output responsive to the control input and a second voltage at the voltage input; and
  a phase hopping generator to including: a ramp generator to generate a phase varying ramp voltage based on a reference voltage, including by adjusting the phase varying ramp voltage from a first phase to a second phase at an end of a cycle; and a switching output responsive to the phase varying ramp voltage, the switching output being coupled to the control input of the switching device.

2. The power converter of claim 1, wherein the power converter is configured to maintain the voltage at the voltage output near the reference voltage.

3. The power converter of claim 1, wherein the phase hopping generator includes:
a filter to generate a feedback signal based on at least one of: the voltage at the voltage output; or the reference voltage; and
a comparator to generate a switching signal at the switching output based on a comparison of the phase varying ramp voltage and the feedback signal.

4. The power converter of claim 3, wherein the comparator is to generate the switching signal to: enable the switching device responsive to the phase varying ramp voltage being higher than the feedback signal; and disable the switching device responsive to the phase varying ramp voltage being lower than the feedback signal.

5. The power converter of claim 1, further comprising a comparator to enable a reset switch responsive to the phase varying ramp voltage being above a threshold, the enabling of the reset switch causing the phase varying ramp voltage to decrease.

6. The power converter of claim 1, wherein the phase hopping generator is configured to vary a voltage at the switching output between the first and the second voltages.

7. The power converter of claim 1, wherein the switching device is a transistor.

8. A power converter comprising:
a switching device including a control input, the switching device being coupled between a voltage input and a voltage output to: increase a voltage at the voltage output responsive to the control input and a first voltage at the voltage input; and decrease the voltage at the voltage output responsive to the control input and a second voltage at the voltage input; and
a phase hopping generator including: a ramp generator to generate a phase varying ramp voltage based on a reference voltage, including by controlling an initial phase of the phase varying ramp voltage for a subsequent cycle; and a switching output responsive to the phase varying ramp voltage, the switching output being coupled to the control input of the switching device.

9. The power converter of claim 8, wherein the power converter is configured to maintain the voltage at the voltage output near the reference voltage.

10. The power converter of claim 8, wherein the phase hopping generator includes:
a filter to generate a feedback signal based on at least one of: the voltage at the voltage output; or the reference voltage; and
a comparator to generate a switching signal at the switching output based on a comparison of the phase varying ramp voltage and the feedback signal.

11. The power converter of claim 10, wherein the comparator is to generate the switching signal to: enable the switching device responsive to the phase varying ramp voltage being higher than the feedback signal; and disable the switching device responsive to the phase varying ramp voltage being lower than the feedback signal.

12. The power converter of claim 8, further comprising at least one capacitor to store the phase varying ramp voltage for the subsequent cycle.

13. The power converter of claim 8, further comprising a comparator to enable a reset switch responsive to the phase varying ramp voltage being above a threshold, the enabling of the reset switch causing the phase varying ramp voltage to decrease.

14. The power converter of claim 8, wherein the phase hopping generator is configured to vary a voltage at the switching output between the first and the second voltages.

15. The power converter of claim 8, wherein the switching device is a transistor.

16. A method comprising:
responsive to a control input of a switching device and a first voltage at a voltage input of the switching device, increasing a voltage at a voltage output of the switching device;
responsive to the control input and a second voltage at the voltage input, decreasing the voltage at the voltage output;
generating a phase varying ramp voltage based on a reference voltage, including adjusting the phase varying ramp voltage from a first phase to a second phase at an end of a cycle; and
responsive to the phase varying ramp voltage, generating a switching signal at a switching output coupled to the control input of the switching device.

17. The method of claim 16, wherein the switching device maintains the voltage at the voltage output near the reference voltage.

18. The method of claim 16, wherein the generating the switching signal includes:
generating a feedback signal based on at least one of: the voltage at the voltage output; or the reference voltage; and
generating the switching signal based on a comparison of the phase varying ramp voltage and the feedback signal.

19. The method of claim 18, wherein generating the switching signal comprises generating the switching signal to: enable the switching device responsive to the phase varying ramp voltage being higher than the feedback signal; and disable the switching device responsive to the phase varying ramp voltage being lower than the feedback signal.

20. The method of claim 16, further comprising enabling a reset switch responsive to the phase varying ramp voltage being above a threshold, the enabling of the reset switch causing the phase varying ramp voltage to decrease.

21. The method of claim 16, wherein a voltage at the switching output varies between the first and the second voltages.

22. The method of claim 16, wherein the switching device is a transistor.

23. A method comprising:
responsive to a control input of a switching device and a first voltage at a voltage input of the switching device, increasing a voltage at a voltage output of the switching device;
responsive to the control input and a second voltage at the voltage input, decreasing the voltage at the voltage output;
generating a phase varying ramp voltage based on a reference voltage, including controlling an initial phase of the phase varying ramp voltage for a subsequent cycle; and
responsive to the phase varying ramp voltage, generating a switching signal at a switching output coupled to the control input of the switching device.

24. The method of claim 23, wherein the switching device maintains the voltage at the voltage output near the reference voltage.

25. The method of claim 23, wherein the generating the switching signal includes:
   generating a feedback signal based on at least one of: the voltage at the voltage output; or the reference voltage; and
   generating the switching signal based on a comparison of the phase varying ramp voltage and the feedback signal.

26. The method of claim 25, wherein generating the switching signal comprises generating the switching signal to: enable the switching device responsive to the phase varying ramp voltage being higher than the feedback signal; and disable the switching device responsive to the phase varying ramp voltage being lower than the feedback signal.

27. The method of claim 23, further comprising storing the phase varying ramp voltage for the subsequent cycle, in at least one capacitor.

28. The method of claim 23, further comprising enabling a reset switch responsive to the phase varying ramp voltage being above a threshold, the enabling of the reset switch causing the phase varying ramp voltage to decrease.

29. The method of claim 23, wherein a voltage at the switching output varies between the first and the second voltages.

30. The method of claim 23, wherein the switching device is a transistor.

* * * * *